(12) United States Patent
de Gans et al.

(10) Patent No.: US 8,772,423 B2
(45) Date of Patent: Jul. 8, 2014

(54) EMULSIONS BASED ON HYDROXYL COMPOUNDS BEARING SILYL GROUPS

(75) Inventors: Berend-Jan de Gans, Muelheim an der Ruhr (DE); Frank Schubert, Neukirchen-Vluyn (DE); Matthias Naumann, Greensboro, NC (US); Wilfried Knott, Essen (DE); Stefan Silber, Krefeld (DE)

(73) Assignee: Evonik Degussa GmbH, Essen (DE)

( * ) Notice: Subject to any disclaimer, the term of this patent is extended or adjusted under 35 U.S.C. 154(b) by 88 days.

(21) Appl. No.: 13/322,475

(22) PCT Filed: Apr. 26, 2010

(86) PCT No.: PCT/EP2010/055495
§ 371 (c)(1), (2), (4) Date: Nov. 25, 2011

(87) PCT Pub. No.: WO2010/136279
PCT Pub. Date: Dec. 2, 2010

(65) Prior Publication Data
US 2012/0071564 A1 Mar. 22, 2012

(30) Foreign Application Priority Data
May 25, 2009 (DE) .......................... 10 2009 022 630

(51) Int. Cl.
*C08G 77/46* (2006.01)
(52) U.S. Cl.
USPC ....................................................... 525/476
(58) Field of Classification Search
USPC ....................................................... 525/476
See application file for complete search history.

(56) References Cited

U.S. PATENT DOCUMENTS

| | | | |
|---|---|---|---|
| 4,645,691 A * | 2/1987 | Ona et al. ...................... 427/180 |
| 5,371,161 A | 12/1994 | Knott |
| 5,401,871 A | 3/1995 | Feldmann-Krane et al. |
| 5,430,166 A | 7/1995 | Klein et al. |
| 5,430,167 A | 7/1995 | Klein et al. |
| 5,455,367 A | 10/1995 | Klein et al. |
| 5,475,127 A | 12/1995 | Klein et al. |
| 5,613,988 A | 3/1997 | Lersch et al. |
| 5,804,099 A | 9/1998 | Karminski et al. |
| 5,863,966 A | 1/1999 | Lersch et al. |
| 5,977,282 A | 11/1999 | Ebbrecht et al. |
| 5,981,812 A | 11/1999 | Knott et al. |
| 6,054,534 A | 4/2000 | Silber et al. |
| 6,194,596 B1 | 2/2001 | Silber et al. |
| 6,255,511 B1 | 7/2001 | Klein et al. |
| 6,288,129 B1 | 9/2001 | Hills et al. |
| 6,291,622 B1 | 9/2001 | Drose et al. |
| 6,297,331 B1 | 10/2001 | Feldmann-Krane et al. |
| 6,307,082 B1 | 10/2001 | Klein et al. |
| 6,391,831 B1 | 5/2002 | Ebbrecht et al. |
| 6,420,324 B1 | 7/2002 | Ebbrecht et al. |
| 6,423,785 B1 | 7/2002 | Reuter et al. |
| 6,433,028 B1 | 8/2002 | Ebbrecht et al. |
| 6,451,863 B1 | 9/2002 | Ebbrecht et al. |
| 6,489,498 B2 | 12/2002 | Klein et al. |
| 6,521,771 B2 | 2/2003 | Knott et al. |
| 6,525,103 B2 | 2/2003 | Ebbrecht et al. |
| 6,552,091 B1 | 4/2003 | Reuter et al. |
| 6,552,092 B2 | 4/2003 | Ebbrecht et al. |
| 6,686,320 B2 | 2/2004 | Ebbrecht et al. |
| 6,835,420 B1 | 12/2004 | Silber et al. |
| 6,858,663 B2 | 2/2005 | Lehmann et al. |
| 6,861,493 B2 | 3/2005 | Esselborn et al. |
| 7,018,458 B2 | 3/2006 | Lehmann et al. |
| 7,118,619 B2 | 10/2006 | Oestreich et al. |
| 7,125,585 B2 | 10/2006 | Dudzik et al. |
| 7,157,541 B2 | 1/2007 | Pott et al. |
| 7,189,772 B2 | 3/2007 | Esselborn et al. |
| 7,196,153 B2 | 3/2007 | Burkhart et al. |
| 7,393,396 B2 | 7/2008 | Weyershausen et al. |
| 7,399,348 B2 | 7/2008 | Tomuschat et al. |
| 7,442,724 B2 | 10/2008 | Ferenz et al. |
| 7,598,334 B2 | 10/2009 | Herrwerth et al. |
| 7,612,158 B2 | 11/2009 | Burkhart et al. |
| 7,612,159 B2 | 11/2009 | Burkhart et al. |
| 7,619,035 B2 | 11/2009 | Knott et al. |
| 7,645,848 B2 | 1/2010 | Knott et al. |
| 7,727,599 B2 | 6/2010 | Venzmer et al. |
| 7,754,778 B2 | 7/2010 | Thum et al. |
| 7,825,205 B2 | 11/2010 | Droese et al. |
| 7,825,206 B2 | 11/2010 | Knott et al. |
| 7,825,209 B2 | 11/2010 | Klein et al. |
| 2004/0024089 A1 | 2/2004 | Oestreich et al. |
| 2004/0063818 A1 | 4/2004 | Silber et al. |
| 2005/0107523 A1 | 5/2005 | Gippert et al. |
| 2007/0128143 A1 | 6/2007 | Leidreiter et al. |
| 2007/0197678 A1 | 8/2007 | Tomuschat et al. |
| 2007/0213226 A1 | 9/2007 | Sieverding et al. |
| 2008/0034794 A1 | 2/2008 | Weyershausen et al. |
| 2009/0012197 A1 | 1/2009 | Landers et al. |
| 2009/0053552 A1 | 2/2009 | Haensel et al. |
| 2009/0137751 A1 | 5/2009 | Knott et al. |

(Continued)

FOREIGN PATENT DOCUMENTS

| | | |
|---|---|---|
| EP | 1533333 | 5/2005 |
| EP | 1892327 | 2/2008 |
| JP | 08-027166 | 1/1996 |

OTHER PUBLICATIONS

International Search Report for PCT/EP2010/055495 dated Sep. 27, 2010.

(Continued)

*Primary Examiner* — Kuo-Liang Peng

(74) *Attorney, Agent, or Firm* — Frommer Lawrence & Haug LLP

(57) ABSTRACT

The invention relates to emulsions containing hydroxyl compound bearing silyl groups, to the production and to the use thereof.

8 Claims, 4 Drawing Sheets

(56) References Cited

U.S. PATENT DOCUMENTS

| | | |
|---|---|---|
| 2009/0137752 A1 | 5/2009 | Knott et al. |
| 2009/0149573 A1 | 6/2009 | Venzmer et al. |
| 2010/0022435 A1 | 1/2010 | Knott et al. |
| 2010/0036011 A1 | 2/2010 | Ferenz et al. |
| 2010/0041910 A1 | 2/2010 | Knott et al. |
| 2010/0055760 A1 | 3/2010 | Ansorge-Schumacher et al. |
| 2010/0056649 A1 | 3/2010 | Knott et al. |
| 2010/0071849 A1 | 3/2010 | Knott et al. |
| 2010/0081781 A1 | 4/2010 | Knott et al. |
| 2010/0105843 A1 | 4/2010 | Knott et al. |
| 2010/0113633 A1 | 5/2010 | Hubel et al. |
| 2010/0168367 A1 | 7/2010 | Knott et al. |
| 2010/0184913 A1 | 7/2010 | Lehmann et al. |
| 2010/0192814 A1 | 8/2010 | Herzog et al. |
| 2010/0240786 A1 | 9/2010 | Landers et al. |
| 2010/0249339 A1 | 9/2010 | Dudzik et al. |
| 2010/0266518 A1 | 10/2010 | Thum et al. |
| 2010/0292357 A1 | 11/2010 | Knott et al. |
| 2010/0294982 A1 | 11/2010 | Eilbracht et al. |
| 2010/0298455 A1 | 11/2010 | Dudzik et al. |
| 2011/0021693 A1 | 1/2011 | Dudzik et al. |
| 2011/0034576 A1 | 2/2011 | Thum et al. |
| 2011/0042004 A1 | 2/2011 | Knott et al. |
| 2011/0046305 A1 | 2/2011 | Knott et al. |

OTHER PUBLICATIONS

English Translation of Japanese Office Action mailed in JP Patent Application No. 2012-511218, mailed Sep. 9, 2013, Mailing No. 596361.

* cited by examiner

Figure 1:
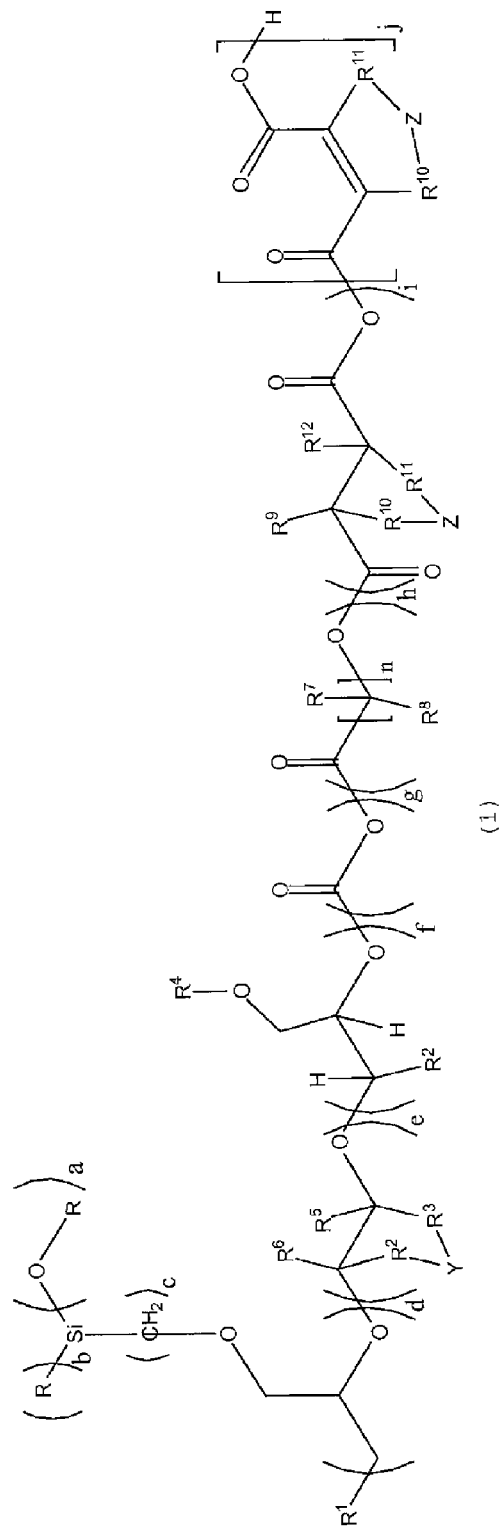

Figure 1 - formula (1)

Figure 2:
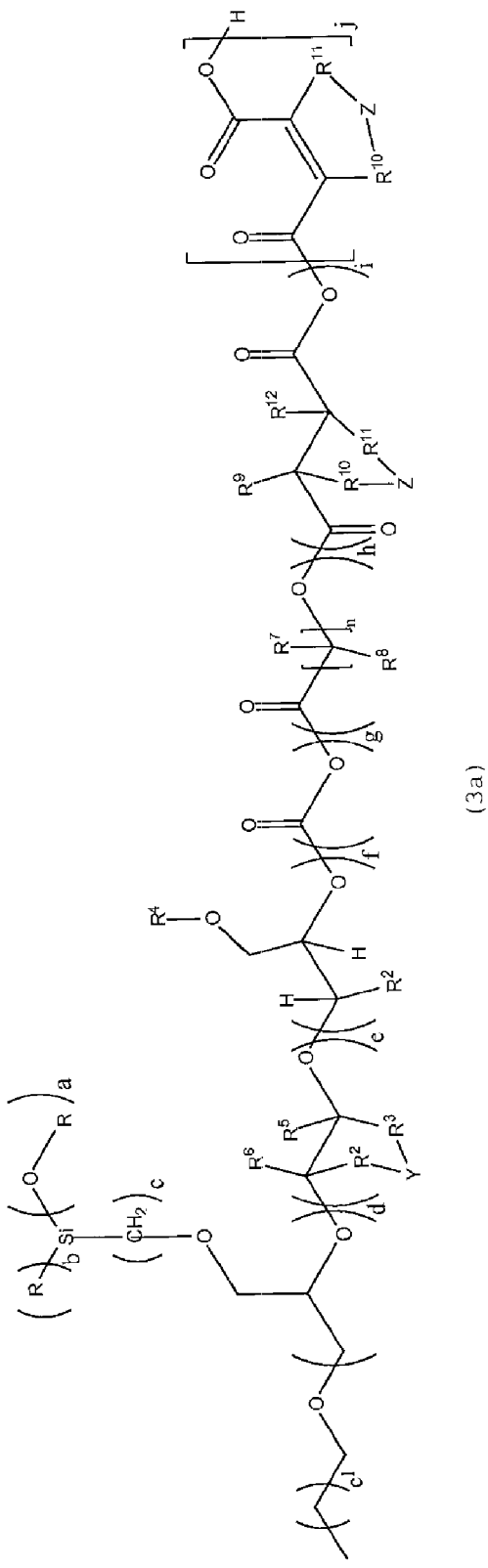

Figure 2 - formula (3a)

Figure 3:
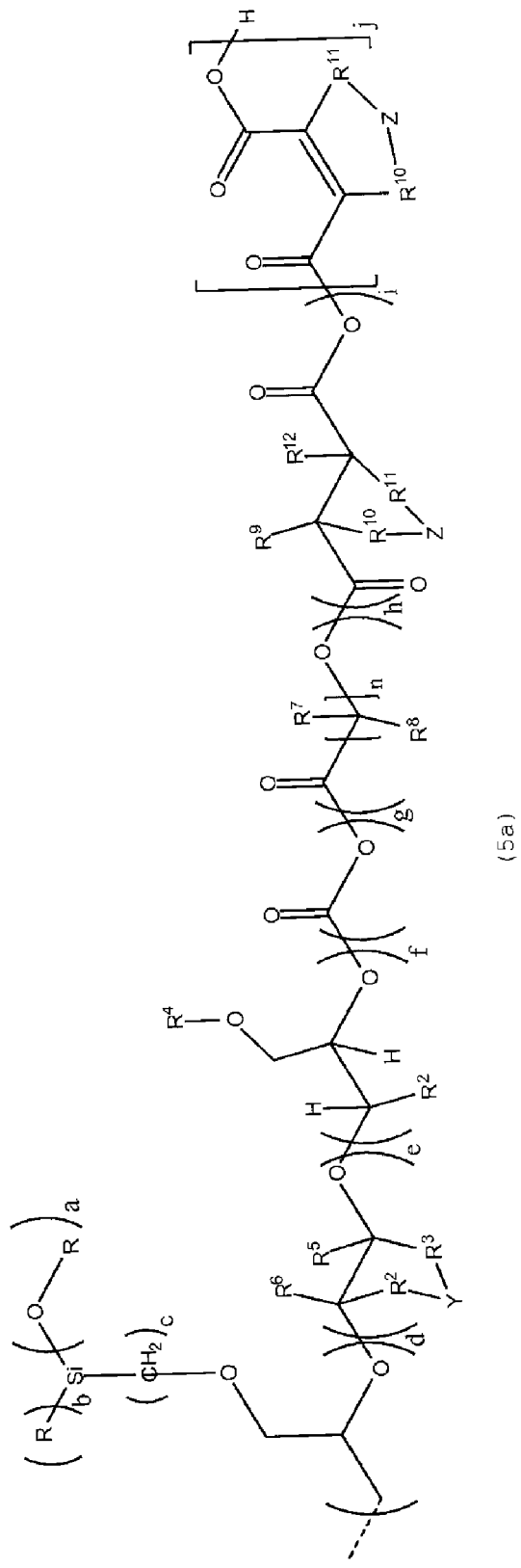

Figure 3 - formula (5a)

Flow curve of the emulsion from example 2

EMULSIONS BASED ON HYDROXYL COMPOUNDS BEARING SILYL GROUPS

The invention relates to emulsions comprising hydroxyl compounds which carry silyl groups, and to the preparation and use of said emulsions.

Figure 4:
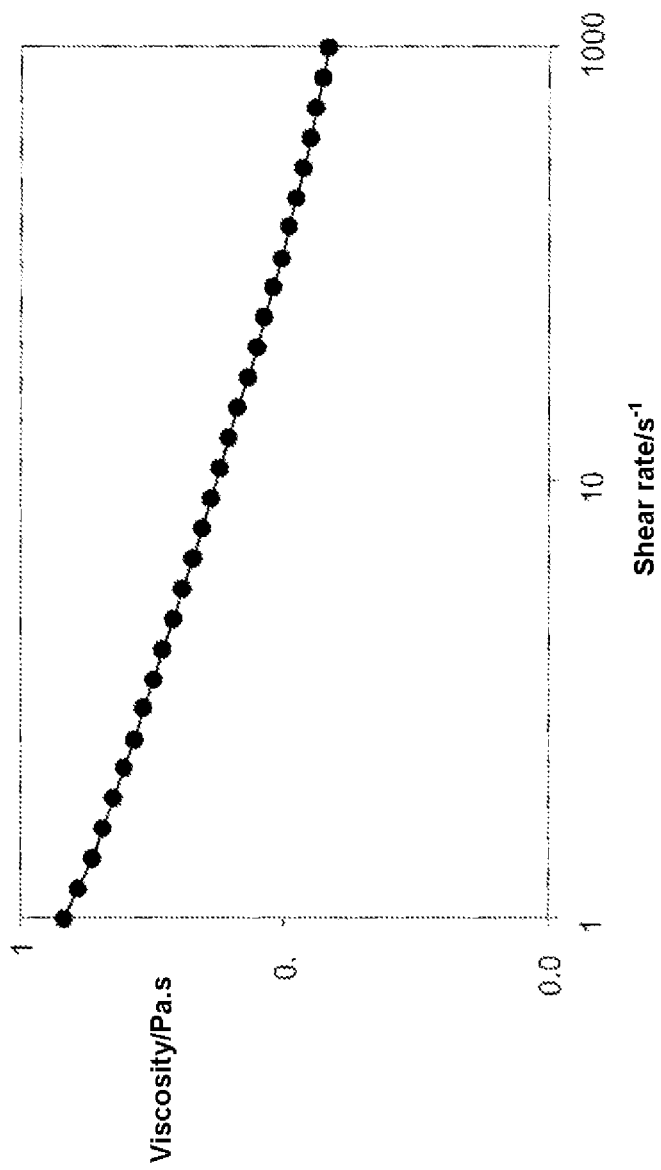

FIG. 1 depicts the chemical structure of formula (1).
FIG. 2 depicts the chemical structure of formula (3a).
FIG. 3 depicts the chemical structure of formula (5a).
FIG. 4 is a flow curve of the emulsion from example 2.

The above amendments are made merely to add a brief description of the drawings, and are clearly supported by the actual drawings themselves. No new matter has been added by the above amendments.

As hydroxyl compounds which carry silyl groups and which are used in the sense of this invention are meant all reaction products which are preparable by alkoxylating epoxy-functional silanes over double metal cyanide catalysts in accordance with the process described in the specification DE 10 2008 000360.3, as yet unpublished at the priority date of the present specification; in particular, these compounds may also carry siloxane groups. These products are referred to hereinafter as silyl polyethers of the formula 1. A silyl group for the purposes of this invention is characterized by different or identical organic or oxyorganic radicals described in references including EP 0 372 561, WO 00/37533 or U.S. Pat. No. 6,207,766. In addition, however, there are also widespread systems whose backbone consists wholly or at least partly of organosiloxanes, described in references including WO 96/34030. A disadvantage of all of the prepolymers described is the low density of functionalization of the prepolymers terminated with silyl groups only in $\alpha,\omega$ position.

This disadvantage can be overcome through the use of new hydroxyl compounds which carry silyl groups and are described in the as yet unpublished specification DE 10 2008 000360.3, or else of polyether alcohols which carry alkoxysilyl groups and are obtainable by alkoxylating epoxide-functional alkoxysilanes over double metal cyanide (DMC) catalysts. The polyethersiloxanes which carry alkoxysilyl groups and are described in the as yet unpublished specification DE 10 2008 044373.5 may likewise be prepared by double metal cyanide catalysis. The two specifications are hereby introduced in full as part and subject matter of this disclosure. These new polyether(siloxane) structures, which may have not only alkoxysilane functions within the sequence of the oxyalkylene units of the polyether chain, but also new multi-alkoxysilane functions in their termini, make it possible to adjust the density of anchor groups in the target prepolymer at will, i.e., in adaptation to the specific performance objective.

Formula 1

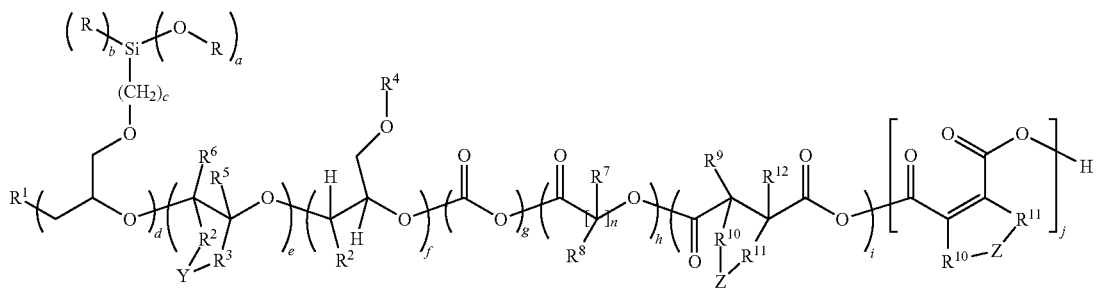

see also FIG. 1

Prepolymer systems which possess terminal reactive alkoxysilyl groups, examples being alkoxysilane-terminated, moisture-curing one-component polyurethanes, are much used in the production of coatings and also of elastic sealants and adhesives in the sectors of industry and construction and in the automobile industry. Commercially available examples of such prepolymers are the MS Polymers from Kaneka, or the Geniosils from Wacker. Accordingly, alkoxysilane-functional polyurethanes which crosslink via silane polycondensation are well established. An overview article on this topic is found, for example, in "Adhesives Age" 4/1995, page 30 ff. (authors: Ta-Min Feng, B. A. Waldman).

Terminally alkoxysilane-functionalized polyurethanes of these kinds may be prepared in accordance with U.S. Pat. No. 3,627,722 or U.S. Pat. No. 3,632,557 by reacting, for example, polyether polyols with an excess of polyisocyanate to give an NCO-containing prepolymer, which is then reacted further in turn with an amino-functional alkoxysilane. The resultant alkoxysilane-functional prepolymer contains urea groups and urethane groups in high concentration, leading to a high viscosity on the part of the products. Besides polyethers, the organic backbone may be composed of, for example, polyurethanes, polyesters, polyacrylates, polyvinyl esters, ethylene-olefin copolymers, styrene-butadiene copolymers or polyolefins. Prepolymers of this kind are Furthermore, they contain hydroxyl groups that are still free, and that are available for further functionalization.

Insofar as the prepolymers are water-insoluble, the viscosity of the prepolymers can be reduced using volatile organic solvents. Such solvents are often referred to by the abbreviation VOC (Volatile Organic Compounds). For a multitude of organic solvents, a damaging effect on health has been found or else is at least supposed. Consequently, a series of laws and regulations have been pronounced for the purpose of protecting environment and health, with the aim of reducing VOC emissions. The European VOC Directive of 1999, for example, prescribes statutory requirements for reducing VOC emissions (Directive 1999/13/EC and 2004/42/EC).

As an alternative to the organic solvents, an option is to use the water-insoluble prepolymers in the form of an aqueous emulsion. The use of water is environmentally benign. From an applications standpoint, the use of water is in fact preferred over the use of organic solvents, since the removal, possible corrections or supplements during application of the material prior to curing can be made with water and/or with an aqueous surfactant solution. However, the prepolymers described have the property of a structurally induced hydrolytic instability. It is therefore not easy to use the prepolymers in the form of an aqueous emulsion. For emulsification, the substances are emulsified in water using what are called emulsifiers and employing shearing forces. The viscosity and the rheological profile of an emulsion of this kind are determined primarily by the rheology of the continuous, aqueous phase. Depending on the area of application, the rheological profile may be varied by means of additives, from an emulsion of very low viscosity through to a paste of high viscosity.

Generally speaking, both amphiphilic molecules and particles are contemplated as emulsifiers. Emulsions stabilized by means of particles are also termed 'Pickering' emulsions (S. U. Pickering: "Emulsions", J. Chem. Soc. 1907, vol. 91, pp. 2001-2021). By undergoing addition to the water-prepolymer interface, such emulsifiers prevent the coalescence of the emulsion droplets and hence the breaking of the emulsion. If the prepolymers themselves have an amphiphilic character, it may be the case that there is no need to add additional emulsifiers. In that case, the skilled person refers to the system as a self-emulsifying system.

The inventive object is therefore to prepare stable and hydrolysis-resistant emulsions, in water, from silyl-containing prepolymers described in specifications DE 10 2008 000360.3 and DE 10 2008 044373.5.

Emulsions of silylated prepolymers are subject matter of a multitude of specifications. In specification DE 2558653, Chang describes emulsions of self-emulsifying polyurethanes which carry silyl groups, and the use thereof for the coating of surfaces. The polyurethanes are prepared by reaction of a polyol with an excess of polyisocyanate. In a second step, the excess isocyanate is reacted partially with a reactive silane. A stable emulsion is obtained when this polymer is incorporated into water with shearing. In specification U.S. Pat. No. 4,376,149, Martin describes emulsified mixtures of silylated polyethers and OH-siloxanes, and also the use thereof in the coating of textiles. Shimizu and Yoshida, in specification JP 1318066, describe aqueous emulsions of silylated polyethers which may additionally contain colloidal silica. The silylated polyethers are prepared by linking a polypropylene glycol diglycidyl ether with a trialkoxysilyl glycidyl ether through a cyclic or aromatic diamine. Klauck, Maier, and Berthauer, in specification DE 4215648, describe storage-stable contact adhesives based on solutions or emulsions of cationically modified, alkoxysilane-terminated polyurethanes. In specification DE 19955825, Majolo, Klauck, Klein, Ernst, Schilling, and Loth describe emulsions of silyl-functionalized polymers with a polymer mass fraction of at least 60%. Likewise described are emulsions of mixtures of at least two different polymers, one with and one without the silyl groups. It is claimed that the described emulsions of silyl-functionalized polymers exhibit an improved storage life in comparison to nonemulsified polymers. Altes et al. in specifications U.S. Pat. No. 6,713,558 and U.S. Pat. No. 6,831,128 describe water-dilutable emulsions of silylated elastomers and their preparation. The emulsions have a mass elastomer fraction of at least 75% for a droplet size of less than 5 μm. Hattemer, Unger, Ferencz, Bachon, Bathelt, and Schmidt, in specification WO 2006/122684, describe emulsions of α-silyl-terminated prepolymers and their preparation and use. Wu, You, and Huang, in specification WO 2007/072189, describe emulsions of prepolymers which carry silyl groups. The emulsions are stabilized by the addition of nanosilica. The addition of conventional emulsifiers is optional and is said in some cases to bring about an additional improvement in the emulsion stability. In specification WO 2008/090458, Wu, You, and Huang describe emulsions of prepolymers which carry silyl groups. The emulsions are stabilized by the addition of monomer silanes. The addition both of nanosilica and of conventional emulsifiers is again optional, and is said in certain cases to result in an additional improvement in emulsion stability. The selection of suitable emulsifiers, and the preparation of stable emulsions suitable for the particular application, are by no means trivial and present a great challenge even to the skilled person. In particular, the hydrolytic instability of the prepolymers containing silyl groups is cause for doubt with regard to the predictability of stable emulsion systems.

In spite of the supposed and structurally related hydrolytic sensitivity of the prepolymers described in specifications DE 10 2008 000360.3 and DE 10 2008 044373.5, it has now surprisingly been found that the prepolymers can be converted into stable emulsions.

The invention therefore provides stable, hydrolysis-resistant aqueous emulsions based on either hydroxyl compounds which carry silyl groups, as described in specification DE 10 2008 000360.3, and/or on silyl-functionalized polyether siloxanes, also called alkoxysilyl-functional silicone polyethers or alkoxysilyl-functional polyether-siloxane copolymers, as described in specification DE 10 2008 044373.5.

A subject of the invention are therefore stable, hydrolysis-resistant, aqueous emulsions comprising silyl-functionalized polyethers having at least one nonterminal silyl function, preferably more than one nonterminal silyl function and more preferably more than one nonterminal silyl function and also, simultaneously, at least one terminal silyl function in the molecule. More particularly they contain more than one (1) alkoxysilyl function per chain end that is reactive toward epoxide groups.

An emulsion is termed stable if the emulsion, preferably after one month of storage at room temperature, but at least after one week of storage at room temperature, exhibits no signs of breaking that are visible to the eye. The breaking of an emulsion is defined here as its separation into a macroscopic oil phase and water phase, respectively. An emulsion is termed stable to hydrolysis if, after one month of storage as room temperature, but at least after one week of storage at room temperature, the amount of free alcohol in the emulsion corresponds to a dissociation of not more than 10% by weight of the emulsified alkoxy groups.

The optimum mass fraction of water and/or polyether(siloxane) is dependent on the application. It is left up to the skilled person to find the optimum mass fraction of polyether (siloxane) for a particular area of use. To the skilled worker, however, it is a familiar concept that the preferred fraction of water in such emulsions is between 10% to 97% by weight, more preferably between 20% and 90% by weight, and more particularly greater than 30% by weight.

The silyl-functionalized polyethers as described in specification DE 10 2008 000360.3 consist of chains which are substituted by alkoxysilyl groups and which, through the choice of the fragments d to j in the formula (1), corresponding to the fragments inserted into the polymer chain through the reaction, with ring opening, of the reaction components, are specifically highly functionalized and can therefore be custom-tailored for different kinds of application fields

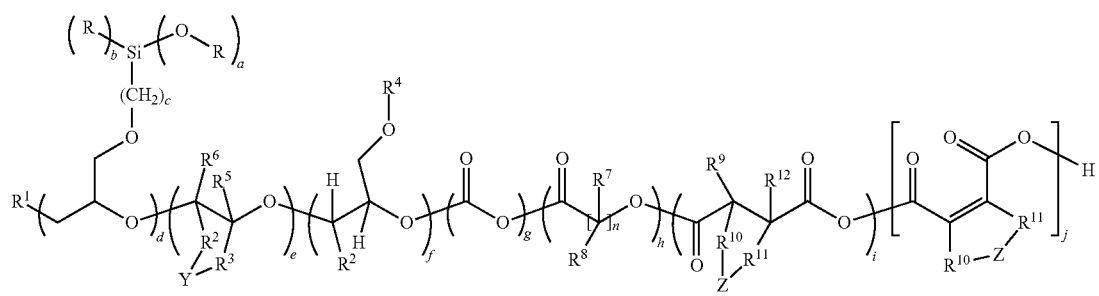

(1)

see also FIG. 1
where
- a is an integer from 1 to 3, preferably 3,
- b is an integer from 0 to 2, preferably 0 to 1, more preferably 0,
  - the sum of a and b being 3,
- c is an integer from 0 to 22, preferably from 0 to 6, more preferably 1 or 3,
- d is an integer from 1 to 1000, preferably greater than 1 up to 100, more preferably greater than 1 up to 20, and more particularly greater than 1 up to 10, or greater than 10 up to 100,
- e is an integer from 0 to 10 000, preferably 0 to 1000, more preferably 0 to 300, and more particularly 0 to 100,
- f is an integer from 0 to 1000, preferably 0 to 100, more preferably 0 to 50, and more particularly 0 to 30,
- g is an integer from 0 to 1000, preferably 0 to 200, more preferably 0 to 100, and more particularly 0 to 70,
- h, i, and j are integers from 0 to 500, preferably 0 to 300, more preferably 0 to 200, and more particularly 0 to 100, and with the proviso that the fragments with the indices d to j are freely permutable with one another, i.e., are interchangeable with one another in the sequence within the polyether chain,
- n is an integer between 2 and 8, and
- R represents one or more identical or different radicals selected from linear or branched, saturated, singularly or multiply unsaturated alkyl radicals having 1 to 20, more particularly 1 to 6, carbon atoms or haloalkyl groups having 1 to 20 carbon atoms. R corresponds preferably to methyl, ethyl, propyl, isopropyl, n-butyl, and sec-butyl groups, and more particularly to ethyl or methyl groups, and
- $R^1$ is a saturated or unsaturated, optionally branched radical, attached preferably via an oxygen atom, or represents a polyether radical of the type of an alkoxy, arylalkoxy or alkylarylalkoxy group, in which the carbon chain may be interrupted by oxygen atoms, or $R^1$ is an optionally singularly or multiply fused aromatic aryloxy group, or a silicon-containing compound, more particularly a siloxane radical or poly(siloxane) radical, which may be alkyl- and/or aryl-group- and/or polyether-substituted,
- $R^2$ or $R^3$, and also $R^5$ or $R^6$, identically or else independently of one another, are H or a saturated or optionally singularly or multiply unsaturated, also further-substituted, optionally monovalent or polyvalent hydrocarbon radical, it being the case for the radicals $R^5$ or $R^6$ that they are a monovalent hydrocarbon radical.
  - The hydrocarbon radical might be bridged cycloaliphatically via the fragment Y; Y may not be present, or else may be a methylene bridge having one or two methylene units—if Y is not present, then $R^2$ or $R^3$ independently of one another are a linear or branched radical having 1 to 20, preferably 1 to 10, carbon atoms, more preferably a methyl, ethyl, propyl or butyl, vinyl, allyl radical or phenyl radical. Preferably at least one of the two radicals $R^2$ or $R^3$ is hydrogen. $R^2$-$R^3$ may be a —CH$_2$CH$_2$CH$_2$CH$_2$— group, Y therefore a —(CH$_2$CH$_2$—)— group. The hydrocarbon radicals $R^2$ and $R^3$ may in turn be further-substituted and may carry functional groups such as halogens, hydroxyl groups or glycidyloxypropyl groups,
- $R^4$ corresponds to a linear or branched alkyl radical of 1 to 24 carbon atoms or to an aromatic or cycloaliphatic radical which optionally in turn may carry alkyl groups.
- $R^7$ and $R^8$ are, independently of one another, alternatively hydrogen or alkyl, alkoxy, aryl or aralkyl groups which are copolymerized with ring-opening polymerization to give crosslinkable polyether esters containing alkoxysilane groups,
- $R^9$, $R^{10}$, $R^{11}$, and $R^{12}$ are independently of one another alternatively hydrogen or alkyl, alkenyl, alkoxy, aryl or aralkyl groups. The hydrocarbon radical may be bridged cycloaliphatically or aromatically via the fragment Z, and Z may represent either a divalent alkylene or alkenylene radical.

The various monomer units not only of the fragments with the index numbers d to j but also of the optionally present polyoxyalkylene chain of the substituent $R^1$ may be of blockwise construction with one another or else may be subject to a statistical distribution. The index numbers reproduced in the formulae given here, and the value ranges for the indices indicated, are therefore to be understood as the average values of the possible statistical distribution of the structures and/or mixtures thereof that are actually present. This also applies to structural formulae which as such, per se, are reproduced exactly, such as for formula (1), for example.

As shown by $^{29}$Si NMR and GPC analyses, the process-related presence of end-of-chain OH groups is accompanied by the possibility for transesterification reactions on the silicon atom not only during the DMC-catalyzed preparation but also, for example, in a downstream procedural step. In such reactions, formally, the alkyl radical R attached to the silicon via an oxygen atom is replaced by a long-chain modified alkoxysilyl polymer radical. Bimodal and multimodal GPC curves demonstrate that the alkoxylation products include not only the species which have not undergone transesterification, as shown in formula (1), but also those with two times, in some cases three times, or even a multiple of the molar mass. Formula (1) is therefore only a simplified representation of the complex chemical reality.

The compositions, accordingly, also comprise compounds in which the sum of the indices (a) plus (b) in formula (1) is on average less than 3, since some of the OR groups may be replaced by silyl polyether groups. The compositions, accordingly, comprise species which are formed on the silicon atom, with elimination of R—OH and condensation reaction with the reactive OH group of a further molecule of the formula (1). This reaction may run a number of times, until, for example, all of the RO groups on the silicon have been replaced by further molecules of the formula (1). The presence of more than one signal in typical $^{29}$Si NMR spectra for these compounds underlines the occurrence of silyl groups having a different substitution pattern. The reported values and preference ranges for the indices a to j are hence also to be understood only as average values across the variety of individually uncapturable species.

As the skilled person is aware, the crosslinking or curing of alkoxysilyl groups takes place in a two-stage chemical procedure, in which, in a first step, in the presence of water—where atmospheric moisture may also be sufficient—the alkoxy groups attached on the silicon are eliminated in the form of the corresponding alcohols, and SiOH groups are formed. The latter groups condense subsequently, in the case of self-condensation, with one another to form Si—O—Si bridges, and form polymeric materials. Alternatively, the SiOH— functional intermediates react with substrates having reactive groups, as for example, particularly effectively, with oxidic and/or silicatic surfaces that carry OH functions (for example, mullite, aluminum oxide or else magnesium oxide), and result in excellent chemical anchorage on the substrate in question. The curing rate can be influenced diversely by adding catalysts or varying temperatures.

Preference is given to the use of curable silyl polyethers 1 having more than 1 alkoxysilyl function, very preferably those having on average more than one such silyl group per terminal hydroxyl group in emulsion compositions.

The polyethersiloxanes of DE 10 2008 044373.5 that are used with preference carry at least one alkoxysilyl group in the copolymer structure. The alkoxysilyl-modified polyethers of the formula (1) which can be used in accordance with the invention may be obtained by the alkoxylation of epoxides modified with silyl groups and of a starter alcohol from any of a very wide variety of different provences.

The preparation and the types of epoxide structure that can be used are described comprehensively in the European patent application with the application number EP 09152883.6, unpublished at the priority date of the present specification. The content of the description and of the claims of EP 09152883.6 and of the corresponding correspondent priority application DE 10 2008 00360.3, unpublished at the priority date of the present specification, is hereby regarded in full as part of the present disclosure.

The silyl polyethers 1 grant the freedom in synthesis to choose between polyoxyalkylene compounds having alkoxysilyl groups that comprise the hydrolyzingly crosslinkable alkoxysilyl functions not only terminally but also in isolation, in blocklike accumulation or else in random scattering in the polyoxyalkylene chain. A feature of silyl polyethers 1 of the formula (1) of this kind is that in terms of structure and molar mass they can be prepared specifically and reproducibly. The sequence of the monomer units can be varied within wide limits. Epoxide monomers can be incorporated into the polymer chain randomly or in arbitrary blocklike sequencing. The fragments inserted into the resultant polymer chain through the reaction, with ring opening, of the reaction components are freely permutable with one another in their sequence, with the restriction that cyclic anhydrides and also carbon dioxide are present inserted randomly, in other words not in homologous blocks, in the polyether structure.

Where silyl polyethers 1 used comprise those which contain on the silicon atom more than 1 of the highly functionalized polyalkylene ether fragments attached, the highly functionalized compounds present are compounds in which polyether chains, derived in each case from a starter alcohol of the formula $R^1$—H (2) and comprising in their sequence the freely permutable fragments inserted into the resultant polymer chain through the reaction, with ring opening, of the reaction components, are linked to one another via —CH$_2$—O—(CH$_2$)$_c$—Si—(CH$_2$)$_c$—O—CH$_2$— bridges. These structures are highly complex, highly functionalized structures. Here as well, the functionalities can be adjusted specifically for a desired application field. The degree of branching and the complexity of the polymer structures obtained increase with increasing epoxy functionality of the silyl monomers. The chain length of the polyether radicals with alkoxy, arylalkoxy or alkylarylalkoxy groups that can be used as starter compound is arbitrary. The polyether, alkoxy, arylalkoxy or alkylarylalkoxy group preferably contains 1 to 1500 carbon atoms, more preferably 2 to 300 carbon atoms, more particularly 2 to 100 carbon atoms.

In one alternative the group $R^1$ originates from a starter alcohol $R^1$—H (2), which is used in the DMC-catalyzed alkoxylation; for compounds of the formula (2), for example, mention may be made of allyl alcohol, butanol, octanol, dodecanol, stearyl alcohol, 2-ethyl-hexanol, cyclohexanol, benzyl alcohol, ethylene glycol, propylene glycol, di-, tri-, and polyethylene glycol, 1,2-propylene glycol, di- and polypropylene glycol, 1,4-butanediol, 1,6-hexanediol, trimethylolpropane, glycerol, pentaerythritol, sorbitol, cellulose sugar, lignin or else further hydroxyl-carrying compounds based on natural substances. If, alternatively, a siloxane moiety is to be introduced as $R^1$ into the silyl polyether, then, for example, α,ω-dihydroxy-polysiloxanes, hydrogensiloxanes or hydroxyl-functional polyethersiloxanes are used as starting compounds.

Within the bounds of the preceding definitions, the fragments inserted into the resultant polymer chain by the reaction with ring opening may occur in blocklike or random distribution, not only in the chain of a polyether structural unit but also in random distribution over the multitude of polyether structural units that are formed and that are joined to one another via —CH$_2$—O—(CH$_2$)$_c$—Si—(CH$_2$)$_c$—O—CH$_2$— bridges. The multifariousness of the structural variations in the process products hence does not allow any clear formulawise description.

The various monomer units both of the fragments with the index numbers d to j and of the optionally present polyoxyalkylene chain of the substituent $R^1$ may be of blocklike construction with one another or else may be subject to a statistical distribution. The index numbers reproduced in the formulae given here, and the value ranges of the indices indicated, are therefore to be understood as the average values of the possible statistical distribution of the structures and/or mixtures thereof that are actually present. This also applies to structural formulae which are represented as such, per se, exactly, such as for formula (1), for example.

With very particular preference, 3-glycidyloxyalkyl-trialkoxysilanes or 3-glycidyloxyalkyldialkoxyalkyl-silanes are used as monomers.

Depending on the epoxide-functional alkoxysilane and any further monomers used, and also, possibly, carbon dioxide as well, it is possible to prepare alkoxysilyl-modified polyether alcohols (1), and also their mixtures of arbitrary construction.

If, therefore, a (poly-)siloxane radical is introduced as $R^1$ into the molecule, then alkoxysilyl-functional polyethersiloxanes are used in accordance with the invention.

These alkoxysilyl-functional polyethersiloxanes and mixtures thereof can be prepared by two different processes, as set out in DE 2008 0044373.5:
1) alkoxylation of silicone polyether copolymers or polysiloxanes with epoxy-functional alkoxysilanes over double metal cyanide catalysts and/or
2) hydrosilylating linkage of unsaturated, alkoxysilyl-carrying polyethers obtained beforehand by an alkoxylation of the corresponding unsaturated starter compounds with epoxy-functional alkoxysilanes over DMC catalysts.

The silyl-functionalized polyethersiloxanes as described in specification DE 10 2008 044373.5 are compounds of formula (3) and mixtures thereof,

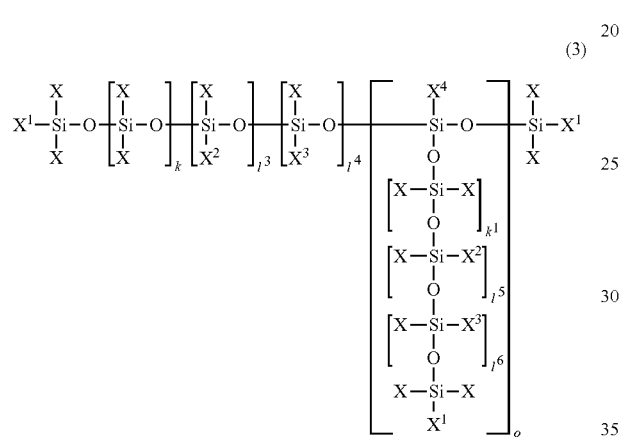

(3)

where
X is a linear, cyclic or branched, aliphatic or aromatic, saturated or unsaturated hydrocarbon radical having 1 to 20 C atoms, which may optionally contain heteroatoms such as oxygen, nitrogen, phosphorus or sulfur, but which is preferably a methyl group,
$X^1$ is alternatively X, $X^2$ or $X^3$,
$X^2$ is an OH-functional polyoxyalkylene radical of the formula (3a) which carries alkoxysilyl groups and is optionally ester- or carbonate-modified, see also FIG. 2
$X^3$ is a terminally etherified polyoxyalkylene radical of the formula (3b),

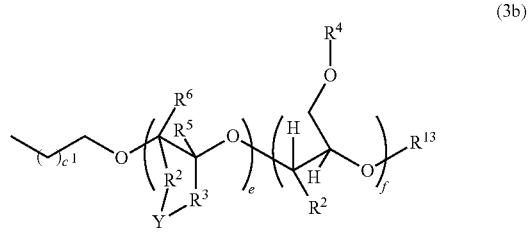

(3b)

where
$R^{13}$ alternatively is an alkyl group having 1 to 18 C atoms, preferably methyl,
or is a polyoxyalkylene radical of the formula (3c) that is terminally esterified with a monofunctional carboxylic acid,

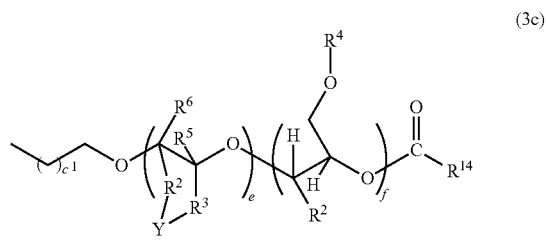

(3c)

where
$R^{14}$ is a saturated or a singularly or multiply unsaturated, either linear or branched, aliphatic or aromatic hydrocarbon radical having 1-30 carbon atoms, which in turn may carry OH groups, and is preferably a methyl radical,
$X^4$ corresponds either to $X^1$ or to the fragment of the formula (3d)

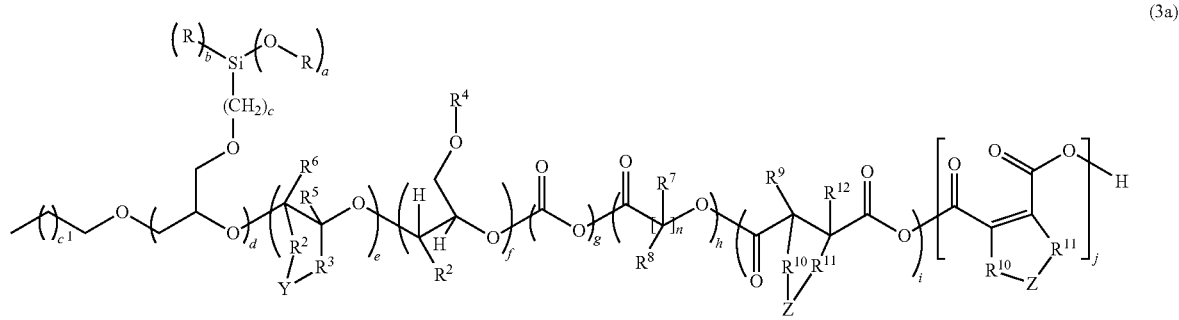

(3a)

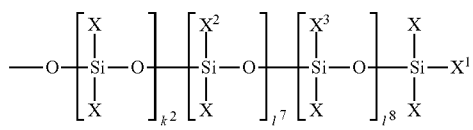
(3d)

where
- k, $k^1$ and $k^2$ independently of one another are integers from 0 to 500, preferably from 10 to 200, more particularly 15 to 100,
- $l^3$, $l^4$, $l^5$, $l^6$, $l^7$, and $l^8$ independently of one another are integers from 0 to 60, preferably from 0 to 30, more particularly from 0 to 25,
- o is an integer from 0 to 10, preferably from 0 to 3, with the proviso that
- $X^1$ is at least once equal to $X^2$, if the sum of $l^3$, $l^5$, and $l^7$ is zero,
- and that the sum of $l^3$, $l^5$, and $l^7$ is at least one if $X^1$ is other than $X^2$, where
- a is an integer from 1 to 3, preferably 3,
- b is an integer from 0 to 2, preferably 0 to 1, more preferably 0,
- the sum of a and b being 3,
- c is an integer from 0 to 22, preferably from 0 to 6, more preferably 1 or 3,
- $c^1$ is an integer from 0 to 24, preferably from 0 to 12, more preferably from 0 to 8, very preferably from 0 to 4,
- d is an integer of greater than 1 to 1000, preferably greater than 1 up to 100, more preferably greater than 1 up to 20, and more particularly greater than 1 up to 10, or greater than 10 up to 100,
- e is an integer from 0 to 10 000, preferably 0 to 1000, more preferably 0 to 300, and more particularly 0 to 100,
- n is an integer from 2 to 8, and
- f, g, h, i, and j are each integers from 0 to 500, preferably 0 to 300, more preferably 0 to 200, more particularly 0 to 100, with the proviso that the fragments with the indices d to j are freely permutable with one another, i.e. are interchangeable with one another in the sequence within the polyether chain, it being possible for the various monomer units of the fragments with the index numbers d to j to be of blockwise construction with one another or else to be subject to a statistical distribution, and with the proviso that the fragments with the indices, k, $k^1$, $k^2$, $l^3$, $l^4$, $l^5$, $l^6$, $l^7$, $l^8$, and o are freely permutable with one another, i.e., are interchangeable with one another within the siloxane chain, and may be present alternatively in statistical distribution or blocklike sequencing.

R represents one or more identical or different radicals selected from linear or branched, saturated, singularly or multiply unsaturated alkyl radicals having 1 to 20, more particularly 1 to 6, carbon atoms, or haloalkyl groups having 1 to 20 carbon atoms, preferably a methyl, ethyl, propyl, isopropyl, n-butyl or sec-butyl group.

$R^2$ or $R^3$, and $R^5$ or $R^6$, are, identically or independently of one another, H or a saturated or optionally singularly or multiply unsaturated, also further-substituted, optionally monovalent or polyvalent hydrocarbon radical, it being the case for the radicals $R^5$ or $R^6$ that they are a monovalent hydrocarbon radical.

The hydrocarbon radical might be bridged cycloaliphatically via the fragment Y; Y may not be present, or else may be a methylene bridge having 1 or methylene units; if Y is 0, then $R^2$ or $R^3$ independently of one another are a linear or branched radical having 1 to 20, preferably 1 to 10, carbon atoms, more preferably a methyl, ethyl, propyl or butyl, vinyl, allyl radical or phenyl radical. Preferably, at least one of the two radicals in $R^2$ or $R^3$ is hydrogen. The hydrocarbon radicals $R^2$ and $R^3$ may in turn be further substituted and may carry functional groups such as halogens, hydroxyl groups or glycidyloxypropyl groups.

$R^4$ is a linear or branched alkyl radical of 1 to 18 carbon atoms, which may be attached to an aromatic or cycloaliphatic radical.

$R^7$ and $R^8$ are, independently of one another, alternatively hydrogen or alkyl, alkoxy, aryl or aralkyl groups.

$R^9$, $R^{10}$, $R^{11}$, and $R^{12}$ are independently of one another alternatively hydrogen or alkyl, alkenyl, alkoxy, aryl or aralkyl groups, it being possible for the hydrocarbon radical to be bridged cycloaliphatically or aromatically by the fragment Z, and for Z to represent a divalent alkylene or alkenylene radical.

The polyethersiloxanes described by formula (3) include the byproducts that may optionally be present as a concomitant to the procedure, such as free excess polyethers or rearrangement products.

The various monomer units within the siloxane chain and/or within the polyether chain linked thereto may, among one another, be alternatively of blockwise or random construction. The index numbers that are reproduced in the formulae given here and the ranges of values for the indices indicated, are to be understood as the average values of the possible statistical distribution of the actual isolated structures and/or mixtures thereof. This also applies to structural formulae which as such, per se, are represented exactly. The polyethersiloxanes with alkoxysilyl functionalization of the formula (3) usually constitute copolymers with comblike branching, in which the polyether chains are attached in each case via SiC bonds to the polysiloxane scaffold.

Likewise possible for use in accordance with the invention are linear polyether-siloxane-polyether triblock copolymers of the formula (5) in which the polyether chains furnished with alkoxysilyl groups are attached via an Si—O—C linkage to the siloxane structure,

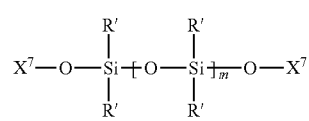
(5)

where
- R' corresponds to one or more identical or different linear or branched, saturated, singularly or multiply unsaturated alkyl radicals having 1 to 20, more particularly 1 to 10, carbon atoms, and
- m is an integer from 0 to 5000, preferably 2 to 5000, more preferably from 5 to 4000, and more particularly 9 to 3000, and
- $X^7$ corresponds to the polyether fragment of the formula (5a)

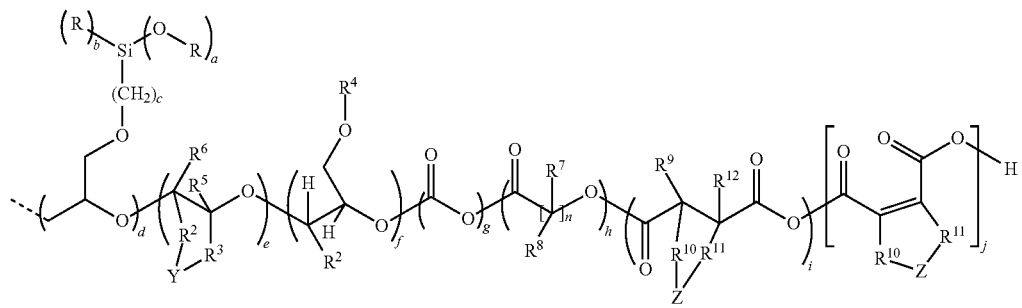

(5a)

see also FIG. 3

The substituents R, $R^2$-$R^{12}$, the radicals Y and Z, and the indices a, b, c, d, e, f, g, h, i, j, and n correspond to the definitions stated above for the compounds of the formula (3a).

The invention further provides emulsions in which the compounds of the formulae (1), (3) and/or (5) are used in each case alone or in any desired mixtures with one another.

The index numbers that are reproduced in the formulae (3) to (3d) and (5) and also (5a), and the value ranges for the indices indicated, are to be understood as the average values of the possible statistical distribution of the structures and/or mixtures thereof that are actually present.

Conventional emulsifiers contemplated for the prepolymer emulsions of the invention include in principle all anionic, nonionic, cationic, and amphoteric emulsifiers and also emulsifier mixtures.

The anionic emulsifier or mixture of anionic emulsifiers may be selected from the group encompassing alkyl sulfates, arylsulfonates, fatty alcohol sulfates, alkylsulfonates, paraffinsulfonates, alkyl ether sulfates, alkyl polyglycol ether sulfates, fatty alcohol ether sulfates, alkylbenzenesulfonates, alkylnaphthylsulfonates, alkylphenyl ether sulfates, alkyl phosphates, phosphoric acid mono-, di-, and tri-esters, alkyl ether phosphates, ethoxylated fatty alcohol phosphoric esters, alkylphenyl ether phosphates, phosphonic esters, sulfosuccinic diesters, sulfosuccinic monoesters, ethoxylated sulfosuccinic monoesters, sulfosuccinamides, α-olefinsulfonates, alkyl carboxylates, alkyl ether carboxylates, alkyl polyglycol carboxylates, fatty acid isethionate, fatty acid methyltauride, fatty acid sarcoside, arylsulfonates, naphthalenesulfonates, alkyl glyceryl ether sulfonates, sulfated oils, polyacrylates and/or α-sulfo fatty acid esters. The anionic emulsifier may comprise, for example, sodium, potassium, ammonium, monoethanolammonium, triethanolammonium or other organically substituted ammonium cations as counterion.

Preferred anionic emulsifiers are sodium dodecyl-benzenesulfonate, sodium lauryl sulfate, and sodium lauryl ether sulfate.

The cationic emulsifier or emulsifiers may be selected from the group encompassing not only primary and secondary but also tertiary amines and salts thereof, alkyltrimethylammonium salts, dialkyldimethylammonium salts, trialkylmethylammonium salts, tetraalkylammonium salts, alkoxylated alkylammonium salts, ester quats, diamidoamine quats, alkyloxyalkyl quats, quaternary alkylphosphonium salts, ternary alkylsulfonium salts, alkylimidazolium salts, alkyloxazolinium salts, alkylpyridium salts or N,N-dialkylmorpholinium salts. The cationic emulsifier may comprise, for example, chloride, bromide, methyl sulfate, sulfate or the like as counterion.

The nonionic emulsifier or emulsifiers may be selected from the group encompassing alcohols, fatty acids, alcohol ethoxylates, polyoxyethylene-polyoxypropylene-alkyl ethers, amine alkoxylates, fatty alcohol polyglycol ethers, fatty amine polyglycol ethers, fatty acid ethoxylates, fatty acid polyglycol esters, glyceride monoalkoxylates, alkanolamides, fatty acid alkylolamides, ethoxylated alkanolamides, ethoxylated esters, as for example castor oil ethoxylates, fatty acid alkylolamido ethoxylates, ethylene oxide-propylene oxide block copolymers, alkylphenol ethoxylates, alkylglucosides, partial esters of aliphatic carboxylic acids with polyfunctional alcohols, as for example sorbitan esters, glycerol esters or polyglycerol esters, ethoxylated partial esters of aliphatic carboxylic acids with polyfunctional alcohols, as for example ethoxylated sorbitan esters, ethoxylated glycerol esters or ethoxylated polyglycerol esters, polyethoxylated polystyrene phenyl ethers, amides of aliphatic carboxylic acids with alkanolamines, ethoxylated amides of aliphatic carboxylic acids with alkanolamines and/or polyalkoxylated organopoly-siloxanes.

Preferred nonionic emulsifiers are castor oil ethoxylates, isotridecyl alcohol polyglycol ethers, sorbitan esters, ethylene oxide-propylene oxide block copolymers, stearyl alcohol ethoxylates, and stearic acid ethoxylates.

Further preferred emulsifiers are ethylene oxide-propylene oxide block copolymers which carry alkoxysilyl groups and which can be prepared in accordance with the teaching of specification DE 10 2008 000360.3, unpublished at the priority date of the present specification.

The amphoteric emulsifier/emulsifiers may be selected from the group encompassing amphoacetates, amphodiacetates, glycinates, amphopropionates, amphodipropionates, hydroxysultaines, amine oxides, sulfobetaines and/or betaines.

Preferred amphoteric emulsifiers are betaines and amine oxides.

The aqueous phase of the emulsions of the invention may comprise hydrophilic fillers for modifying the (mechanical) properties of coatings based on the emulsions of the invention. It may be advantageous if the surface of the fillers used has at least one functional group, with the consequence, after drying-up or breaking of the emulsion, that chemical reactions take place between reactive functional groups of the prepolymer usable in accordance with the invention and the functional groups on the particle surface. Examples of such fillers are fumed and precipitated silicas, inorganic oxides and mixed oxides such as aluminum oxide, titanium dioxide, and zirconium dioxide, glass and quartz, hydroxides such as aluminum hydroxide and magnesium hydroxide, silicates such as wollastonite, mica, kaolin, and talc, calcium carbonate and other carbonates, metals such as copper, zinc, and nickel, and metal alloys, nitrides such as boron nitride, carbides such as silicon carbide, graphite, and carbon black. Further examples of such fillers are organic particles, such as, for example, those based on cellulose, lignin, oxidized polyethylene or cured epoxy resin. The fillers, either in the form of powder or in the form of an aqueous dispersion, can be incorporated with stirring during or after the preparation of the emulsion. Commercially available examples of such dispersions are Aerodisp (Evonik Degussa), Ludox (W. R. Grace), Dispercoll (Bayer Materials Science) or Klebosol (Clariant).

The aqueous phase may further comprise additives for modifying the rheological properties of the emulsions of the invention. Preferred examples of such additives are polyurethane thickeners, xanthan gum, guar gum, carboxymethylcellulose, polyacrylates, polyvinyl alcohol, polyvinylpyrrolidone, carboxyvinyl polymers, hydroxyethylcellulose, and polyethyleneimines.

For assisting and/or accelerating the condensation reaction, the emulsions of the invention may comprise catalysts. Depending on the area of application and physical properties, the catalyst may be used in solution or dispersion either in the aqueous phase or in the prepolymer. Where the catalyst is water-insoluble or takes the form of a water-insoluble, catalyst-containing solution, the catalyst or catalyst-containing solution may be added as a separate dispersion, emulsion or microemulsion and also as a separate solid or liquid to the emulsion of the invention. Where the catalyst is a water-soluble catalyst or takes the form of an aqueous, catalyst-containing solution, the catalyst or catalyst-containing solution can be incorporated into the prepolymer phase, optionally with the aid of corresponding emulsifiers. As catalysts for the curing of the polyether(siloxanes) of the invention which carry alkoxysilyl groups it is possible to use the known polyurethanization, allophanatization or biuretization catalysts, which are known to the skilled person from the prior art. These include compounds such as, for example, the zinc salts zinc octoate, zinc acetylacetonate, and zinc-2-ethylcaproate, or tetraalkylammonium compounds, such as N,N,N-tri-methyl-N-2-hydroxypropylammonium hydroxide, N,N,N-tri-methyl-N-2-hydroxypropylammonium 2-ethylhexanoate or cholin 2-ethylhexanoate. Preferred is the use of zinc octoate (zinc 2-ethylhexanoate) and of the tetraalkylammonium compounds, more preferably that of zinc octoate. As catalysts, furthermore, it is possible to use the commonly used organic tin compounds, such as dibutyltin dilaurate, dioctyltin dilaurate, dibutyltin diacetylacetonate, dibutyltin diacetate or dibutyltin dioctoate, etc., for example. Furthermore, it is also possible to use bismuth catalysts, an example being the Borchi catalyst, titanates, e.g., titanium (IV) isopropoxide, iron(III) compounds, e.g., iron(III) acetylacetonate, aluminum compounds, e.g., aluminum acetylacetonate, calcium compounds, e.g., calcium ethylenediaminetetraacetate, magnesium compounds, e.g. magnesium ethylenediaminetetraacetate, or else amines, examples being triethylamine, tributylamine, 1,4-diazabicyclo[2.2.2]octane, 1,8-diazabicyclo[5.4.0]un-dec-7-ene, 1,5-diazabicyclo[4.3.0]non-5-ene, N,N-bis-(N,N-dimethyl-2-aminoethyl)methylamine, N,N-dimethyl-cyclohexylamine, N,N-dimethylphenylamine, N-ethyl-morpholine, etc. Organic or inorganic Brönsted acids as well, such as methanesulfonic acid, p-toluenesulfonic acid, dodecylbenzenesulfonic acid, 1-naphthalene-sulfonic acid, camphorsulfonic acid, acetic acid, trifluoroacetic acid or benzoyl chloride, hydrochloric acid, phosphoric acid, the monoesters and/or diesters thereof, such as, for example, butyl phosphate, (iso) propyl phosphate, dibutyl phosphate, etc., are suitable as catalysts. Inorganic and organic Brönsted bases as well, such as, for example, sodium hydroxide, tetramethylammonium hydroxide, potassium hydroxide or tetrabutylammonium hydroxide, are suitable as catalysts. It is of course also possible to use combinations of two or more catalysts. The curable modifiers of the invention may also comprise what are called photolatent bases as catalysts, as are described in WO 2005/100482. By photolatent bases are meant preferably organic bases having one or more basic nitrogen atoms, which are initially present in a blocked form and which release the basic form only after irradiation with UV light, visible light or IR radiation, by dissociation of the molecule.

The catalyst and/or the photolatent base is used in amounts of 0.001% to 5.0% by weight, preferably 0.01% to 1.0% by weight, and more preferably 0.05% to 0.5% by weight, based on the alkoxysilyl-functional prepolymers. The catalyst and/or the photolatent base can be added in one portion or else portionwise or else continuously. It is preferred to add the total amount in one portion.

Furthermore, the prepolymer phase may comprise organofunctional and (partially) water-insoluble silanes for the further raising of the crosslinking density. The silanes may optionally take on the role of a reactive diluent. Organofunctional silanes of this kind are, for example, tetraethoxysilane, methyltriethoxysilane, N-cyclohexylaminomethyltrimethoxysilane, N-cyclohexyl-3-aminopropyltriethoxysilane, 3-aminopropyltrimethoxysilane, vinyltrimethoxysilane, vinyltriethoxysilane, vinyldimethoxymethylsilane, 3-isocyanatopropyltrimethoxysilane, 3-glycidyloxypropyltrimethoxysilane, 3-glycidyloxypropyltriethoxysilane, 3-methacryloyloxypropyltrimethoxysilane, methyltrimethoxysilane, methyltriethoxysilane, dimethyldimethoxysilane, phenyltriethoxysilane, octyltrimethoxysilane, octyltriethoxysilane, and hexadecyltrimethoxysilane.

The prepolymer phase may further comprise organofunctional and (partially) water-insoluble siloxanes. Organofunctional siloxanes of this kind are, for example, α,ω-dihydroxypolydimethylsiloxanes, α,ω-bis(trimethoxysilyl)polydimethylsiloxanes, and α,ω-bis(triethoxysilyl)polydimethylsiloxanes.

The emulsions, furthermore, may also be admixed with auxiliaries known from the literature and from the prior art. These include, for example, film-forming poly(meth)acrylates, silicone/(meth)acrylate copolymers, poly-N-acylalkyleneimines, poly-N-methylpyrrolidones, and silicone resins having fluorinated organic groups, amino groups or silanol groups. Further examples are antimicrobial and preservative substances (e.g., triclosan, triclocarban, hexachlorophene), antioxidants (e.g., BHA, BHT, ascorbic acid, and γ-orizanol), dispersants, defoamers and deaerating agents, dyes, colorants, pigments, antifreeze agents (e.g., ethanol, ethylene glycol, 1,3-butylene glycol, propylene glycol, glycerol or isopropanol), fungicides, adhesion promoters and/or reactive diluents, and also plasticizers (e.g., phthalates, benzoates, phosphate plasticizers) and complexing agents (e.g., EDTA, citric acid, and etidronic acid, and also salts thereof). Additionally, spraying assistants, wetting agents, vitamins, growth substances, hormones, and also fragrances, light stabilizers, free-radical scavengers, UV absorbers, (e.g., benzophenone derivatives, benzotriazole derivatives, cimmamic esters or particulate UV absorbers such as ZnO or $TiO_2$, for example, and also further stabilizers, may be added to the mixtures.

The prepolymer emulsions of the invention may be used as raw material for paints, inks, release agents, adhesives, cosmetic products, scratch-resistant coatings, architectural preservatives, corrosion inhibitors and/or sealants, for the coating of paper, particles, textile fibers and glass fibers, for the coating of fillers for paper, for producing antistatic surfaces and/or as starting material for the production of rubber parts on the basis, for example, of polypropylene oxide rubber.

The emulsions of the invention are described by way of example below, without any intention that the invention should be restricted to these exemplary embodiments. Indications given below of ranges, general formulae or classes of compound should be taken to encompass not only the corresponding ranges or groups of compounds that are explicitly mentioned, but also all subranges and subgroups of compounds which can be obtained by extracting individual values (ranges) or compounds. Where documents are cited in the context of the present description, the intention is that their content should belong fully to the disclosure content of the present invention.

EXAMPLES

In the examples below, the preparation is described of emulsions on the basis of silyl-functionalized polyether(siloxane)s. These silyl-functionalized polyether(siloxanes) were prepared in accordance with the process principle of DMC-catalyzed alkoxylation with propylene oxide (PO) and 3-glycidyloxy-propyltriethoxysilane (GlyEO) in the as yet unpublished specifications DE 10 2008 000360.3 and DE 10 2008 044373.5. The viscosity of the prepolymers at 25.0° C. was measured at 100 s$^{-1}$ with a rotational viscometer (Physica MCR301) and cone-plate geometry.

The stability of the emulsions was assessed as follows: the emulsion was stored at room temperature and is considered stable with respect to creaming and/or coalescence if within one week there are no marked signs of instability. Such signs are, for example, the formation of two or more layers or distinctly visible fat spots. The stability with respect to hydrolysis was assessed by determining the alkanol content of the emulsion both directly after preparation and after one week of storage, by means of gas chromatography. The emulsion is considered stable to hydrolysis if the alkanol content is below 0.1%, which at the same time corresponds to the detection limit for the gas chromatograph used (model 6890, Agilent).

Triethoxysilyl Polyether I:
Virtually colorless polyether of largely statistical construction, prepared starting from polypropylene glycol and with an average molar mass of approximately 9000 g/mol, and with quadruple trialkoxysilane functionality.
Chemical construction from monomer metering:
PPG500+128.5 mol PO+4 mol GLYEO Triethoxysilyl Polyether II:
Virtually colorless polyether of largely statistical construction, prepared starting from polypropylene glycol and with an average molar mass of approximately 16 000 g/mol, and with quadruple trialkoxysilane functionality.
Chemical construction from monomer metering:
PPG700+123 mol PO+2 mol GLYEO+123 mol PO+2 mol GLYEO Triethoxysilyl Polyethersiloxane III:
Virtually colorless polyether of largely statistical construction, prepared starting from polyethersiloxane and with an average molar mass of approximately 9000 g/mol, and with quadruple trialkoxysilane functionality. The polyethersiloxane was prepared by hydrosilylation of heptamethyltrisiloxane (HMTS) on a polyethylene oxide-stat-propylene oxide) allyl ether, with a ratio of ethylene oxide to propylene oxide of 20:80. The molecular weight of the polyether was 880 grams per mole.

Chemical construction from monomer metering:
Polyethersiloxane+1.5 mol PO+2 mol GLYEO+1.5 mol PO Triethoxysilyl Polyether IV:
Virtually colorless polyether of largely statistical construction, prepared starting from polypropylene glycol and with an average molar mass of approximately 20 000 g/mol, and with quadruple trialkoxysilane functionality.
Chemical construction from monomer metering:
PPG700+212 mol PO+4 mol GLYEO and 101.5 mol PO.

Example 1

12.0 grams of TEGO® Alkanol S100P (stearyl alcohol, polyoxyethylene (100) ether, Evonik Goldschmidt GmbH), 3.0 grams of TEGO® Alkanol TD6 (isotridecanol, polyoxyethylene (6) ether, Evonik Goldschmidt GmbH) and 15.0 grams of water were heated to 60° C. in a double-wall glass vessel and stirred with a Mizer disk at 1000 rpm until a homogeneous, viscous paste was formed. With the aid of a dropping funnel, over the course of 30 minutes, 100.0 grams of the triethoxysilyl polyether IV were incorporated dropwise into the paste with stirring. The finished paste was stirred at 1000 rpm for 10 minutes. Thereafter the paste was diluted with the remaining 200.0 grams of water. This gave the emulsion.

The droplet size distribution was measured by means of dynamic light scattering (Malvern HPPS with 633 nm HeNe laser). Evaluation of the correlation function using the CONTIN algorithm gave a monomodal droplet size distribution with an average radius of 154 nm.

The ethanol content was determined by means of gas chromatography. Both directly after preparation and after 7 days of storage at room temperature, the content was below the detection limit (0.1%). After a week of storage at room temperature, the emulsion shows no visual signs at all of instability.

Example 2

9.0 grams of TEGO® Alkanol TD12 (isotridecyl alcohol, polyoxyethylene (12) ether), 6.0 grams of Rewopal® LA3 (lauryl alcohol, polyoxyethylene (3) ether), and 20.0 grams of water were heated to 60° C. in a double-wall glass vessel and stirred with a Mizer disk at 1000 rpm until a homogeneous, viscous paste was formed. With the aid of a dropping funnel, over the course of 30 minutes, a homogeneous solution of 20.0 grams of octyltriethoxysilane in 80.0 grams of the triethoxy-silyl polyether I were incorporated dropwise into the paste with stirring. The finished paste was stirred at 1000 rpm for 10 minutes. Thereafter the paste was diluted with the remaining 80.0 grams of water, with stirring. This gave the emulsion. The droplet size distribution was measured by dynamic light scattering (Malvern HPPS). The average droplet radius was 116 nm.

Using a rotary viscometer (Physica MCR301), equipped with cone-plate geometry, the flow curve of the emulsion was measured. The flow curve of the emulsion from example 2 is shown in FIG. 4. The emulsion is shear-thinning. The viscosity at 100 s$^{-1}$ is 0.18 Pa·s, i.e., well below the viscosity of the prepolymer used.

Example 3

12.0 grams of TEGO® Alkanol S100P (stearyl alcohol, polyoxyethylene (100) ether, Evonik Goldschmidt GmbH) 3.0 grams of TEGO® Alkanol TD6 (isotridecanol, polyoxyethylene (6) ether, Evonik Goldschmidt GmbH), and 15.0 grams of water were heated to 60° C. in a double-wall glass vessel and stirred with a Mizer disk at 1000 rpm until a homogeneous, viscous paste was formed. With the aid of a dropping funnel, over the course of 30 minutes, 100.0 grams of the triethoxysilyl polyether III were incorporated dropwise into the paste with stirring. The finished paste was stirred at 1000 rpm for 10 minutes. Thereafter the paste was diluted with the remaining 85.0 grams of water, with stirring. This gave the emulsion. The droplet size distribution was measured by dynamic light scattering (Malvern HPPS). The average droplet radius was 122 nm. Subsequently, 10.0 grams of Aerosil A200 were added to the finished emulsion and incorporated by dispersion by stirring at 2000 rpm for 10 minutes.

Example 4

10.0 grams of Marlon® A315 (dodecylbenzenesulfonate, Na salt, Sasol Germany GmbH), 15.0 g of TEGO® Betaine F50 (cocamidopropylbetaine, Evonik Goldschmidt GmbH), 7.5 grams of TEGO® Alkanol TD6 (isotridecanol, polyoxyethylene (6) ether, Evonik Goldschmidt GmbH) were stirred at room temperature in a plastic beaker with a Mizer disk at 1000 rpm until a homogeneous, viscous paste was formed. With the aid of a dropping funnel, over the course of 30 minutes, 100.0 grams of the triethoxysilyl polyether III were incorporated dropwise into the paste with stirring. The finished paste was stirred at 1000 rpm for 10 minutes. Thereafter the paste was diluted with 100.0 grams of water, with stirring. This gave the emulsion. The droplet size distribution was measured by dynamic light scattering (Malvern HPPS). The average droplet radius was 144 nm.

Example 5

30.0 grams of Synperonic® PE/F108 (25% strength aqueous solution of an EO-PO-EO triblock copolymer, Croda) and 7.5 grams of Pluronic® PE10300 (EO-PO-EO triblock copolymer, BASF) were stirred at room temperature in a plastic beaker with a Mizer disk at 1000 rpm until a homogeneous, viscous paste was formed. With the aid of a dropping funnel, over the course of 30 minutes, 100.0 grams of the triethoxysilyl polyether IV were incorporated dropwise into the paste with stirring. The finished paste was stirred at 1000 rpm for 10 minutes. Thereafter the paste was diluted with 162.5 grams of water, with stirring. This gave the emulsion. The droplet size distribution was measured by dynamic light scattering (Malvern HPPS). The average droplet radius was 251 nm, with a certain coarse fraction (droplet radius >1 micrometer) being evident.

The ethanol content was determined by means of gas chromatography. Both directly after preparation and after 7 days of storage at room temperature, the content was below the detection limit (0.1%). After a week of storage at room temperature, in spite of the coarse fraction, the emulsion shows no visual signs at all of instability.

The invention claimed is:
1. A stable, hydrolysis-resistant aqueous emulsion comprising:
  silyl-functionalized polyethers, and optionally silyl-functionalized polyethersiloxanes, having in each case at least one nonterminal silyl function in the molecule;
  wherein the silyl-functionalized polyethers are compounds of the formula (1):

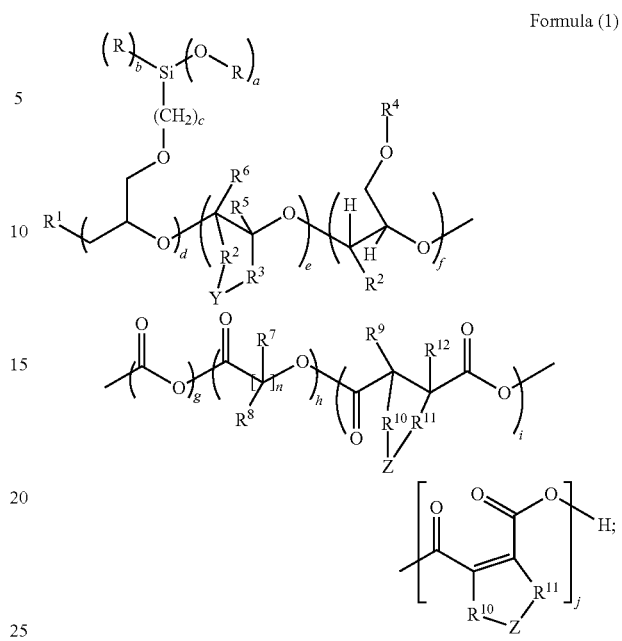

Formula (1)

where:
  a is an integer from 1 to 3;
  b is an integer from 0 to 2;
  the sum of a and b is 3;
  c is an integer from 0 to 22:
  d is an integer from 1 to 1000;
  e is an integer from 0 to 10,000;
  f is an integer from 0 to 1000;
  g is an integer from 0 to 1000; and
  h, i, and j are integers from 0 to 500;
  with the proviso that the fragments with the indices d to j are freely permutable with one another so as to be interchangeable with one another in the sequence within the polyether chain; and
where:
  n is an integer between 2 and 8;
  R represents one or more identical or different radicals selected from linear or branched, saturated, singularly or multiply unsaturated alkyl radicals having 1 to 20 carbon atoms or haloalkyl groups having 1 to 20 carbon atoms;
  $R^1$:
    is a radical, or a polyether radical selected from the group consisting of alkoxy, arylalkoxy, and alkylarylalkoxy radicals, in which the carbon chain is optionally interrupted by oxygen atoms; or
    is an optionally singularly or multiply fused aromatic aryloxy group; or
    is a silicon-containing compound or a siloxane radical or (poly)siloxane radical which is optionally alkyl- and/or aryl-group-substituted;
  $R^2$ and $R^3$, identically or else independently of one another, are each:
    H; or
    a saturated or optionally singularly or multiply unsaturated, also further-substituted, optionally monovalent or polyvalent hydrocarbon radical, where $R^2$ and $R^3$ are optionally bridged cycloaliphatically via the fragment Y;

Y:
  is not be present; or
  is a methylene bridge having 1 or 2 methylene units;
  where if Y is not present then $R^2$ or $R^3$ independently of one another is a linear or branched radical having 1 to 20 carbon atoms;

$R^4$:
  is a linear or branched alkyl radical of 1 to 24 carbon atoms; or
  is an aromatic or cycloaliphatic radical which may optionally in turn carry alkyl groups;

$R^5$ and $R^6$ identically or else independently of one another, are each:
  H; or
  a saturated or optionally singular or multiply unsaturated, also further-substituted, monovalent hydrocarbon radical;

$R^7$ and $R^8$ are, independently of one another, alternatively:
  hydrogen; or
  selected from the group consisting of alkyl, alkoxy, aryl, and aralkyl groups; and $R^9$ and $R^{12}$ are each, independently of one another, alternatively:

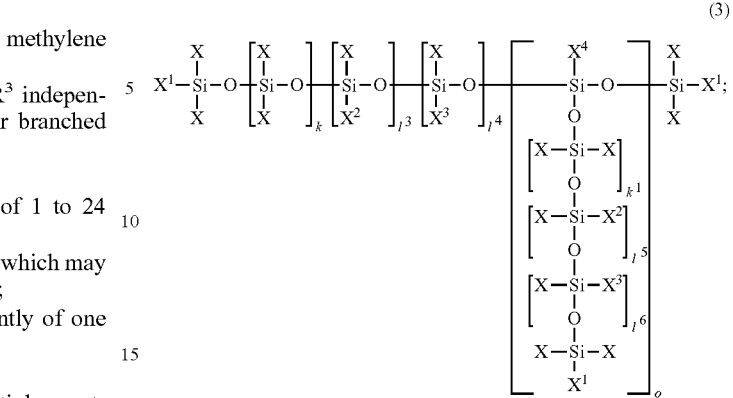

where:
  X is a linear, cyclic or branched, aliphatic or aromatic, saturated or unsaturated hydrocarbon radical having 1 to 20 C atoms, which may comprise heteroatoms;
  $X^1$ is alternatively X, $X^2$, or $X^3$;
  $X^2$ is an OH-functional polyoxyalkylene radical of the formula (3a) which carries alkoxysilyl groups and which are optionally ester- or carbonate-modified:

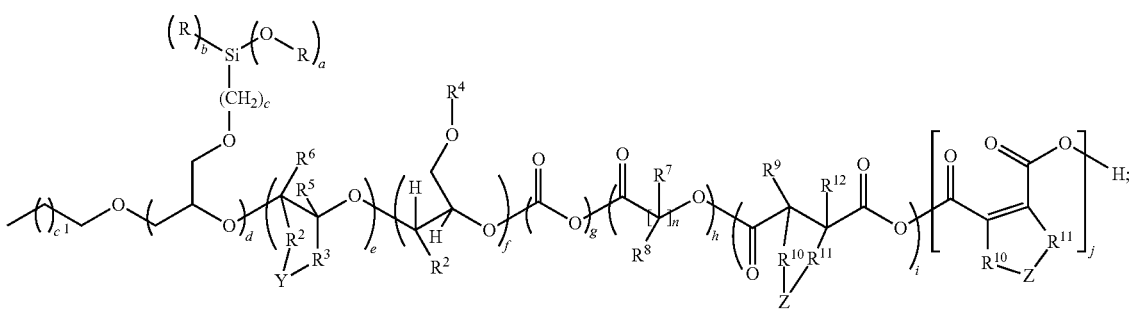

(3a)

hydrogen; or
  an alkyl, alkenyl, alkoxy, aryl, or aralkyl group;

$R^{10}$ and $R^{11}$ are each, independently of one another, alternatively:
  hydrogen; or
  an alkyl, alkenyl, alkoxy, aryl, or aralkyl group, which is optionally bridged cycloaliphatically or aromatically via the fragment Z; and Z:
  is not be present; or
  is a divalent alkylene radical or an alkenylene radical.

2. The emulsion of claim 1;
wherein compositions are present in which the sum of the indices (a) plus (b) in formula (1) is on average less than 3, since some of the OR groups are replaced by silyl polyether groups as a result of transesterification reactions.

3. The emulsion of claim 1;
wherein $R^1$ is a (poly)siloxane radical.

4. The emulsion of claim 3, further comprising:
an alkoxysilyl-functional polyethersiloxane of formula (3) and mixtures thereof:

$X^3$ is a terminally etherified polyoxyalkylene radical of the formula (3b):

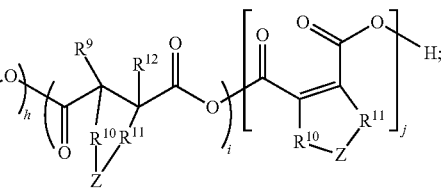

(3b)

R, $R^2$, $R^3$, $R^4$, $R^5$, $R^6$, $R^7$, $R^8$, $R^9$, $R^{10}$, $R^{11}$, $R^{12}$ are defined in claim 1;

$R^{13}$ is alternatively;
  an alkyl group having 1 to 18 C atoms; or
  a polyoxyalkylene radical of the formula (3c) which is terminally esterified with a monofunctional carboxylic acid:

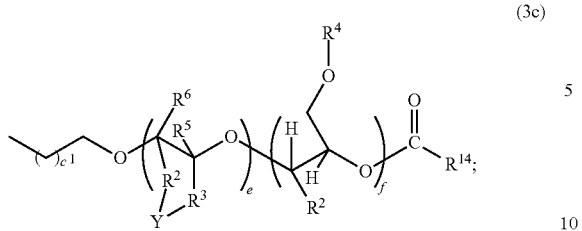

(3c)

where;

$R^{14}$ is a saturated or a singularly or multiply unsaturated, either linear or branched, aliphatic or aromatic hydrocarbon radical having 1-30 carbon atoms, which in turn may carry OH groups and $X^4$ is either $X^1$ or the fragment of the formula (3d);

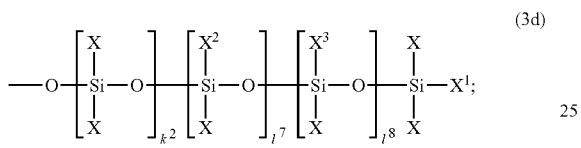

(3d)

where:

$k$, $k^1$, and $k^2$ independently of one another are integers from 0 to 500;

$l^3$, $l^4$, $l^5$, $l^6$, $l^7$, and $l^8$ independently of one another are integers from 0 to 60; and o is an integer from 0 to 10;

with the proviso:

that $X^1$ is at least once $X^2$ if the sum of $l^3$, $l^5$, and $l^7$ is zero; and that the sum of $l^3$, $l^5$, and $l^7$ is at least one if $X^1$ is other than $X^2$;

where:

a, b, c, h, i, j, and n are as defined in claim 1;

$c^1$ is an integer from 0 to 24;

d is an integer from 1 to 500;

e is an integer from 0 to 5000; and f and g are each integers from 0 to 500;

with the proviso that the fragments with the indices d to j are freely permutable with one another, being interchangeable with one another in the sequence within the polyether chain, where the various monomer units of the fragments with the index numbers d to j may be constructed blockwise with one another or else may be subject to a statistical distribution; and with the proviso that the fragments with the indices k, $k^1$, $k^2$, $l^3$, $l^4$, $l^5$, $l^6$, $l^7$, $l^8$, and o are freely permutable with one another, being interchangeable with one another within the siloxane chain, and may be present alternatively with statistical distribution or with block-like sequencing.

5. The emulsion of claim 1;

wherein linear polyether-siloxane-polyether triblock copolymers of the formula (5) are present in which the polyether chains furnished with alkoxysilyl groups are attached via an Si—O—C linkage to the siloxane structure, formula (5) being:

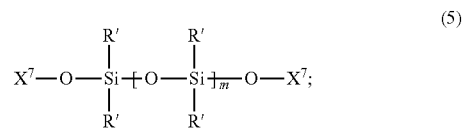

(5)

where:

R' corresponds to one or more identical or different linear or branched, saturated, singularly or multiply unsaturated alkyl radicals having 1 to 20 carbon atoms;

m is an integer from 0 to 5000; and $X^7$ corresponds to the polyether fragment of the formula (5a);

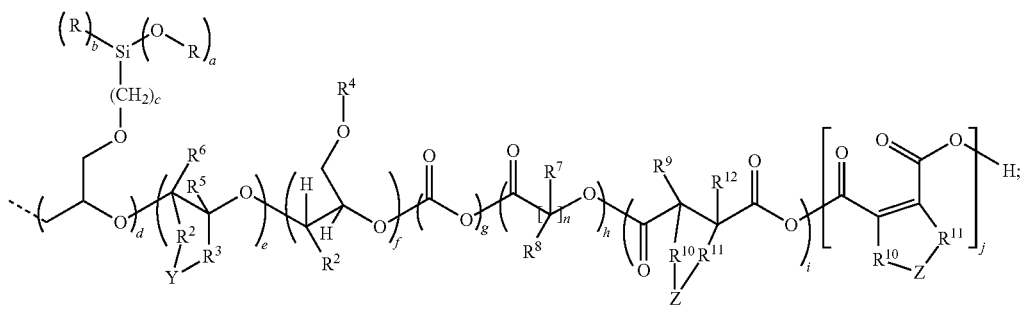

(5a)

where the substituents R, $R^2$-$R^{12}$, the radicals Y and Z, and the indices a, b, c, d, e, f, g, h, i, j, and n.

6. The emulsion of claim 1, further comprising:

emulsifiers selected from the group consisting of anionic, nonanionic, cationic, and amphoteric emulsifiers, and mixtures thereof.

7. The emulsion of claim 1, further comprising:

a compound selected from the groups consisting of catalysts, photolatent bases, additives for modifying the rheological properties, hydrophilic fillers, organofunctional and/or partially soluble and/or water-insoluble silanes and/or siloxanes, auxiliaries, film-formers, antimicrobial and preservative substances, dispersants, defoamers and deaerating agents, dyes, colorants, and pigments, antifreeze agents, fungicides, adhesion promoters and/or reactive diluents, plasticizers and complexing agents, spraying assistants, wetting agents, vitamins, growth substances, hormones and/or fragrances, light stabilizers, free-radical scavengers, UV absorbers, and further stabilizers.

8. A method for the production of paints, inks, release agents, adhesives, cosmetic products, scratch-resistant coatings, architectural preservatives, corrosion inhibitors and/or sealants, for the coating of paper, particles, textile fibers, and glass fibers, for the coating of fillers for paper, for producing antistatic surfaces and/or as starting material for producing rubber parts based on polypropylene oxide, comprising:

utilizing the emulsion of claim 1 as a raw material.

* * * * *